Oct. 4, 1927. 1,644,254

S. KARPINSKY ET AL

METHOD FOR THE MANUFACTURE OF BUTTER

Filed Jan. 16, 1924

Inventors
S. Karpinsky
J. S. Anderson
By Marks & Clerk
Attys.

Patented Oct. 4, 1927.

1,644,254

UNITED STATES PATENT OFFICE.

STEPHAN KARPINSKY, OF SEVRES, AND JAMES STEWART ANDERSON, OF ST. OUEN, FRANCE.

METHOD FOR THE MANUFACTURE OF BUTTER.

Application filed January 16, 1924, Serial No. 686,687, and in France November 21, 1923.

Our invention relates to a process of manufacture of butter and an apparatus wherein the same is carried into effect.

In our invention, the cream which is suitably fermented and has a small amount of air added thereto, is forced at an adequate pressure, for instance three or four kilogrammes per square centimetre, through a series of numerous and very fine interstices which are given a tortuous or irregular form as much as possible; the said interstices can be formed by the use of wire gauze elements which are placed upon one another.

By their passage under pressure through the said narrow and sinuous ducts, the fatty globules are first released from the cells with which they were incorporated, and are then caused to adhere together, and issue in the state of very fine grains of butter floating in the buttermilk.

The appended drawing shows by way of example an embodiment of our invention.

Figure 1:
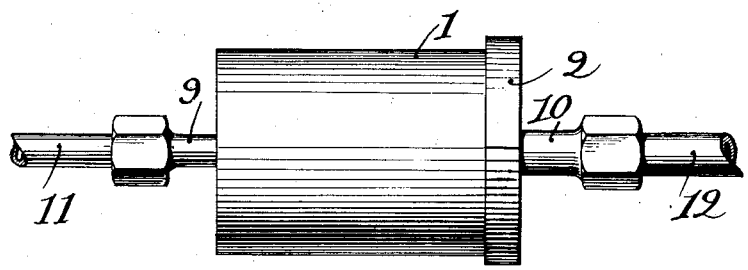
Figure 2:
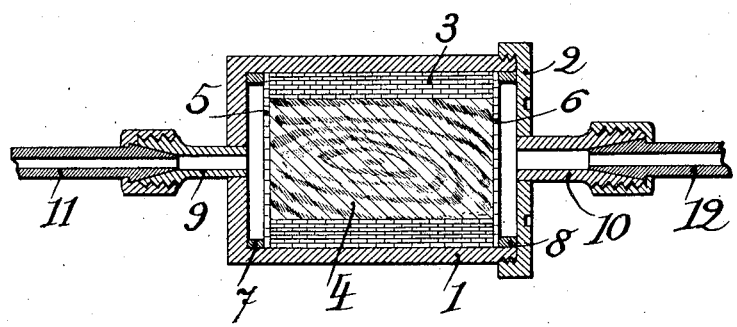
Figure 3:
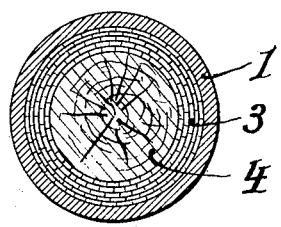

Fig. 1 is an elevational view.
Fig. 2 is a longitudinal section.
Fig. 3 is a transverse section.

The said apparatus comprises a cylindrical vessel 1 closed by a screw plug 2; against the inner wall of the said box is fitted a band of wire gauze 3 which is preliminarily wound in several turns upon a mandrel 4, preferably of wood. The wire gauze or perforated metal discs 5, 6, held by the rings 7 and 8, are placed in the said vessel at either end of said mandrel. At the bottom of the vessel as well as on the said plug are provided the respective conduits 9, 10 to which are secured the cream inlet pipe 11 and the outlet pipe 12.

The operation is as follows:

The fermented cream charged with air is delivered by the pipe 11 and is forced through the wire gauze elements by a pump or by compression in any suitable manner; the wire gauze 5 acts to prevent impurities in the cream from entering the apparatus; when passing through the sinuous interstices of the wire gauze element 3, the fatty globules are finally set free and are then united in the form of fine granules of butter. When issuing from the pipe 12, the butter in very fine grains in suspension in the buttermilk is collected in a receptacle of any kind; this granular state facilitates the washing and the almost complete elimination of the caseines and lactoses which are prejudicial to the good preservation of the butter.

We obtain excellent results for instance with a vessel or box of 35 mm. inside diameter and 60 mm. length, a wood core of 25 mm. diameter and wire gauze having four meshes per square millimetre. The output from this apparatus is some 300 litres of fermented cream per hour, obtained from a skimming which represents 10% of the volume of the milk employed.

The wood core has the advantage of swelling by the moisture and thus pressing the wire gauze parts tightly together; it may however be replaced by a metal cylinder or might be entirely dispensed with, and in the latter case the whole interior section of the box may be filled up with wire gauze. The latter may further be used in the shape of washers or discs which are laid together. For the wire gauze we may substitute other elements adapted to form a great number of narrow and sinuous passages, for instance a granular mass composed of grains of sand, crushed charcoal or like substances having a suitable size, or all other adequate means.

We may also obtain butter from fresh cream, by slightly increasing the quantity of air and the length of the passage through the wire gauze or the like; the fatty globules which remain unchanged by the fermentation will however adhere together with somewhat less facility in this case.

It must be observed that the interstices provided between the wires of the gauzes or between the grains of sand or charcoal and the like, as tightly packed together as may be the said wires or grains, are larger than the size of the fatty globules of the cream (4 to 20 microns); it results therefrom that the fatty globules are not broken by the gauzes or grains or the like, as such is the case in the machines used for homogeneizing milk, and are simply caused to adhere the one to the other by mutual friction or by being forcibly brought together.

Claims:

1. A process for the manufacture of butter from cream consisting in causing the cream which has been previously charged with air to pass through a series of numerous very fine interstices which closely follow each other, these interstices being in a baffle disposition.

2. Process for the manufacture of butter from cream previously charged with air consisting in causing the cream to pass through a series of numerous very fine interstices which closely follow each other, these interstices forming an extremely sinuous path.

3. Process for the manufacture of butter from cream consisting in causing the cream which has been previously charged with air to pass through a series of numerous very fine interstices closely following each other, these interstices forming irregular passages whose walls oppose to the passage of the cream numerous and closely arranged obstacles.

4. Process for the manufacture of butter characterized by the fact that the cream charged with air is caused to pass through a series of sinuous passages having a section larger than that of the fatty globules of the cream, these passages being however sufficiently fine, in sufficient number and closely following each other, so that the said globules of the cream will be caused to agglomerate as grains of butter when passing through the said passages.

In testimony, that we claim the foregoing as our invention we have signed our names.

STEPHAN KARPINSKY.
JAMES STEWART ANDERSON.